(12) United States Patent
Rofougaran et al.

(10) Patent No.: US 7,679,514 B2
(45) Date of Patent: Mar. 16, 2010

(54) MULTI-MODE RFID TAG ARCHITECTURE

(75) Inventors: Ahmadreza (Reza) Rofougaran, Newport Coast, CA (US); Maryam Rofougaran, Rancho Palos Verdes, CA (US); Amin Shameli, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 338 days.

(21) Appl. No.: 11/928,544

(22) Filed: Oct. 30, 2007

(65) Prior Publication Data

US 2008/0238679 A1 Oct. 2, 2008

Related U.S. Application Data

(60) Provisional application No. 60/932,411, filed on May 31, 2007, provisional application No. 60/921,221, filed on Mar. 30, 2007.

(51) Int. Cl.
*G08B 13/14* (2006.01)
(52) U.S. Cl. .............. 340/572.2; 340/572.4; 340/572.7; 340/539.1; 340/825.69; 340/825.72; 340/10.1; 340/10.3

(58) Field of Classification Search ............... 340/572.2, 340/572.4, 572.7, 572.8, 539.1, 825.69, 825.72, 340/10.1, 10.3; 235/383, 385, 487; 342/42, 342/125
See application file for complete search history.

(56) References Cited

U.S. PATENT DOCUMENTS 6,323,566 B1 * 11/2001 Meier ................... 307/10.2
7,196,613 B2 * 3/2007 Horwitz et al. ............ 340/10.1
7,602,274 B2 * 10/2009 Lee et al. ................. 340/10.2

* cited by examiner

*Primary Examiner*—Hung T. Nguyen
(74) *Attorney, Agent, or Firm*—Garlick Harrison & Markison; Jessica W. Smith

(57) ABSTRACT

A multi-mode RFID tag includes a power generating and signal detection module, a baseband processing module, a transmit section, a configurable coupling circuit, and an antenna section. In near field mode, the configurable coupling circuit is operable to couple the transmit section to a coil or inductor in the configurable coupling circuit to transmit an outbound transmit signal using electromagnetic or inductive coupling to an RFID reader. In far field mode, the configurable coupling circuit is operable to couple the transmit section to the antenna section, and the multi-mode RFID tag then utilizes a back-scattering RF technology to transmit the outbound transmit signal to RFID readers.

24 Claims, 6 Drawing Sheets

MULTI-MODE RFID TAG ARCHITECTURE

CROSS REFERENCE TO RELATED PATENTS

This U.S. patent application claims priority under 35 USC §119 to a provisionally filed patent application entitled, "RFID System," having a provisional filing date of Mar. 30, 2007, and a provisional application Ser. No. 60/921,221. This U.S. patent application claims priority under 35 USC §119 to a provisionally filed patent application entitled, "RFID System," having a provisional filing date of May 31, 2007, and a provisional Ser. No. 60/932,411.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

1. Technical Field of the Invention

This invention relates generally to communication systems and more particularly to RFID systems.

2. Description of Related Art

A radio frequency identification (RFID) system generally includes a reader, also known as an interrogator, and a remote tag, also known as a transponder. Each tag stores identification or other data for use in identifying a person, item, pallet or other object or data related to a characteristic of a person, item, pallet or other object. RFID systems may use active tags that include an internal power source, such as a battery, and/or passive tags that do not contain an internal power source, but instead are remotely powered by the reader.

Communication between the reader and the remote tag is enabled by radio frequency (RF) signals. In general, to access the identification data stored on an RFID tag, the RFID reader generates a modulated RF interrogation signal designed to evoke a modulated RF response from a tag. The RF response from the tag includes the coded data stored in the RFID tag. The RFID reader decodes the coded data to identify or determine the characteristics of a person, item, pallet or other object associated with the RFID tag. For passive tags without a battery or other power source, the RFID reader also generates an unmodulated, continuous wave (CW) signal to activate and power the tag during data transfer. Thus, passive tags obtain power from transmissions of the RFID reader. Active tags include a battery and have greater ability to power transceivers, processor, memory and other on-tag devices.

RFID systems typically employ either far field or near field technology. In far field technology, the distance between the reader and the tag is great compared to the wavelength of the carrier signal. Typically, far field technology uses carrier signals in the ultra high frequency or microwave frequency ranges. In far-field applications, the RFID reader generates and transmits an RF signal via an antenna to all tags within range of the antenna. One or more of the tags that receive the RF signal responds to the reader using a backscattering technique in which the tags modulate and reflect the received RF signal.

In near-field technology, the operating distance is usually less than one wavelength of the carrier signal. Thus, the reading range is approximately limited to 20 cm or less depending on the frequency. In near field applications, the RFID reader and tag communicate via electromagnetic or inductive coupling between the coils of the reader and the tag. Typically, the near field technology uses carrier signals in the low frequency range. For the tag coil antennas, RFID tags have used a multilayer coil (e.g., 3 layers of 100-150 turns each) wrapped around a metal core at lower frequencies of 135 KHz. Sometimes, at higher frequency of 13.56 MHz, RFID tags have used a planar spiral coil inductor with 5-7 turns over a credit-card-sized form factor. Such tag coil antennas are large in comparison to the other modules of the RFID tag and are not able to be integrated on a chip, such as a complementary metal-oxide-semiconductor (CMOS), bipolar complementary metal-oxide-semiconductor (BiCMOS) or gallium arsenide (GaAs) integrated circuit, with other modules of the RFID tag.

The International Organization for Standardization (ISO) has developed an RFID standard called the ISO 18000 series. The ISO 18000 series standard describes air interface protocols for RFID systems especially in applications used to track items in a supply chain. The ISO 18000 series has seven parts to cover the major frequencies used in RFID systems around the world. The seven parts are:

18000-1: Generic parameters for air interfaces for globally accepted frequencies;
18000-2: Air interface for below 135 KHz;
18000-3: Air interface for 13.56 MHz;
18000-4: Air interface for 2.45 GHz;
18000-5: Air interface for 5.8 GHz;
18000-6: Air interface for 860 MHz to 930 MHz;
18000-7: Air interface at 433.92 MHz.

According to the ISO 18000-2 and 18000-3 parts of the ISO 18000 series, near-field technology with magnetic/inductive coupling has an air interface protocol at low frequency (LF) of 135 KHz or less or at 13.56 high frequency (HF). ISO 18000-3 defines two modes. In mode 1, the tag to reader data rate is 26.48 kbps while mode 2 is a high speed interface of 105.9375 kbps on each of 8 channels. The communication protocol used by the reader and the tag is typically a load modulation technique.

Far field technology with RF backscatter coupling has three ISO defined air interfaces at 2.45 GHz microwave frequency according to ISO 18000-5, 860 MHZ to 930 MHz ultra high frequency (UHF) range according to ISO 18000-6 and 433.92 MHz UHF according to ISO 18000-7. For UHF at 860-930 MHz, the ISO 18000-6 has defined two tag types, Type A and Type B with a tag to reader link defined as including 40 kbps data rate, Amplitude Shift Keying (ASK) modulation, and biphase-space or FM0 encoding of data.

In addition, the EPCglobal Class 1, Generation 2 standard defines a tag standard using UHF with a tag to reader link of 40 to 640 kbps, ASK or Phase Shift Keying (PSK) modulation and data encoding of FM0 or Miller-modulated subcarrier.

Generally, tags employing near field technology operating at LF or HF have been used in applications involving item-level tagging for inventory control in the supply chain management or applications involving short range reads such as smart cards or vicinity credit cards, e.g. for access control or monetary use, passports, money bills authentication, bank documents, etc. Such applications do not need long range reads of the tags but may need more security provided by near field technology. In addition, near field technology is known for better performance on tags near fluids, such as fluid medications, wherein far field RF coupling tends to incur interference from the fluids.

Tags employing far field technology RF coupling at microwave or UHF have been used in applications involving shipping units such as pallets or carton level tracking or other applications needing long-distance reads.

These different types of technology and the number of different RFID standards, each defining a different protocol for enabling communication between the reader and the tag, has inhibited the wide spread use of RFID tags for multiple applications. Therefore, a need exists for a highly integrated, low-cost RFID tag. In addition, a need exists for a multi-standard, multi-technology RFID tag.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF EMBODIMENTS OF THE INVENTION

Figure 1:
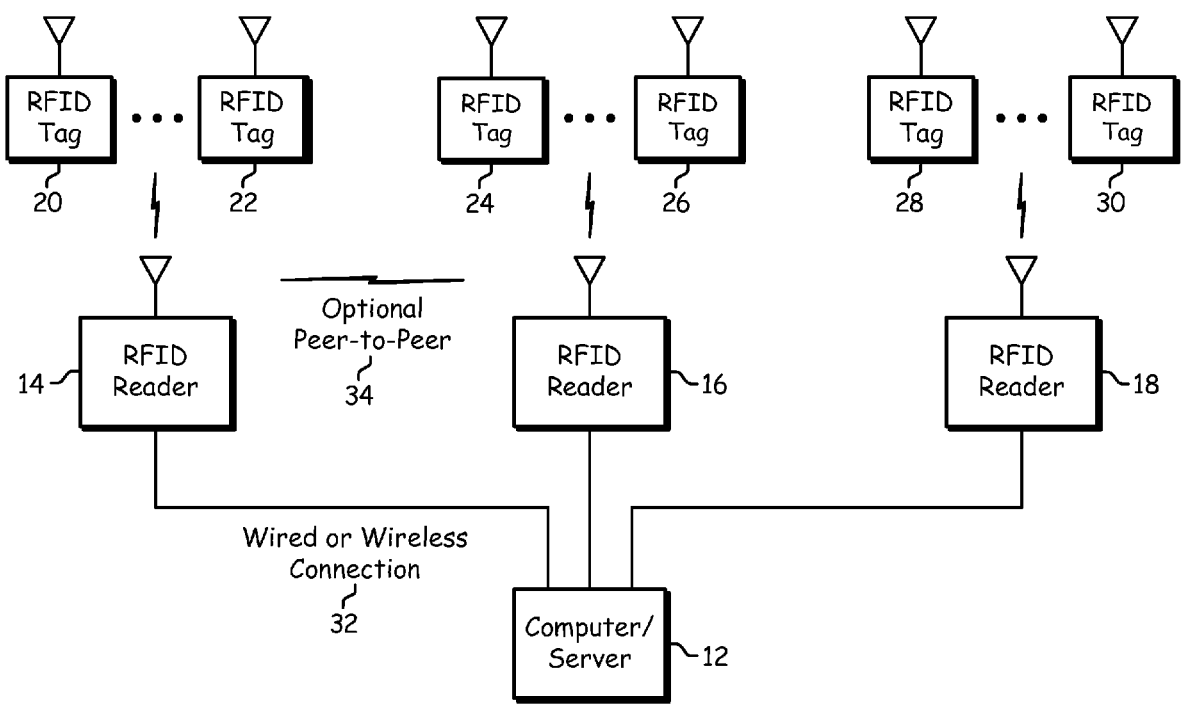
FIG. 1 is a schematic block diagram of an embodiment of an RFID system in accordance with the present invention.

FIG. 1 is a schematic block diagram of an RFID (radio frequency identification) system that includes a computer/server 12, a plurality of RFID readers 14-18 and a plurality of RFID tags 20-30. The RFID tags 20-30 may each be associated with a particular object for a variety of purposes including, but not limited to, tracking inventory, tracking status, location determination, assembly progress, et cetera. The RFID tags may be active devices that include internal power sources or passive devices that derive power from the RFID readers 14-18.

Each RFID reader 14-18 wirelessly communicates with one or more RFID tags 20-30 within its coverage area. For example, RFID tags 20 and 22 may be within the coverage area of RFID reader 14, RFID tags 24 and 26 may be within the coverage area of RFID reader 16, and RFID tags 28 and 30 may be within the coverage area of RFID reader 18. In one mode of operation, the RF communication scheme between the RFID readers 14-18 and RFID tags 20-30 is a backscatter coupling technique using far field technology whereby the RFID readers 14-18 request data from the RFID tags 20-30 via an RF signal, and the RF tags 20-30 respond with the requested data by modulating and backscattering the RF signal provided by the RFID readers 14-18. In another mode of operation, the RF communication scheme between the RFID readers 14-18 and RFID tags 20-30 is a magnetic or inductive coupling technique using near field technology whereby the RFID readers 14-18 magnetically or inductively couple to the RFID tags 20-30 to access the data on the RFID tags 20-30. Thus, in one embodiment of the current invention, the RFID tags 20-30 may communicate in a far field mode to an RFID reader 14-18 with such capabilities and in a near field mode to an RFID reader 14-18 with such capabilities.

The RFID readers 14-18 collect data as may be requested from the computer/server 12 from each of the RFID tags 20-30 within its coverage area. The collected data is then conveyed to computer/server 12 via the wired or wireless connection 32 and/or via peer-to-peer communication 34. In addition, and/or in the alternative, the computer/server 12 may provide data to one or more of the RFID tags 20-30 via the associated RFID reader 14-18. Such downloaded information is application dependent and may vary greatly. Upon receiving the downloaded data, the RFID tag 20-30 can store the data in a non-volatile memory therein.

As indicated above, the RFID readers 14-18 may optionally communicate on a peer-to-peer basis such that each RFID reader does not need a separate wired or wireless connection 32 to the computer/server 12. For example, RFID reader 14 and RFID reader 16 may communicate on a peer-to-peer basis utilizing a back scatter technique, a wireless LAN technique, and/or any other wireless communication technique. In this instance, RFID reader 16 may not include a wired or wireless connection 32 to computer/server 12. In embodiments in which communications between RFID reader 16 and computer/server 12 are conveyed through the wired or wireless connection 32, the wired or wireless connection 32 may utilize any one of a plurality of wired standards (e.g., Ethernet, fire wire, et cetera) and/or wireless communication standards (e.g., IEEE 802.11x, Bluetooth, et cetera).

As one of ordinary skill in the art will appreciate, the RFID system of FIG. 1 may be expanded to include a multitude of RFID readers 14-18 distributed throughout a desired location (for example, a building, office site, et cetera) where the RFID tags may be associated with access cards, smart cards, mobile phones, personal digital assistants, laptops, personal computers, inventory items, pallets, cartons, equipment, personnel, et cetera. In addition, it should be noted that the computer/server 12 may be coupled to another server and/or network connection to provide wide area network coverage.

Figure 2:
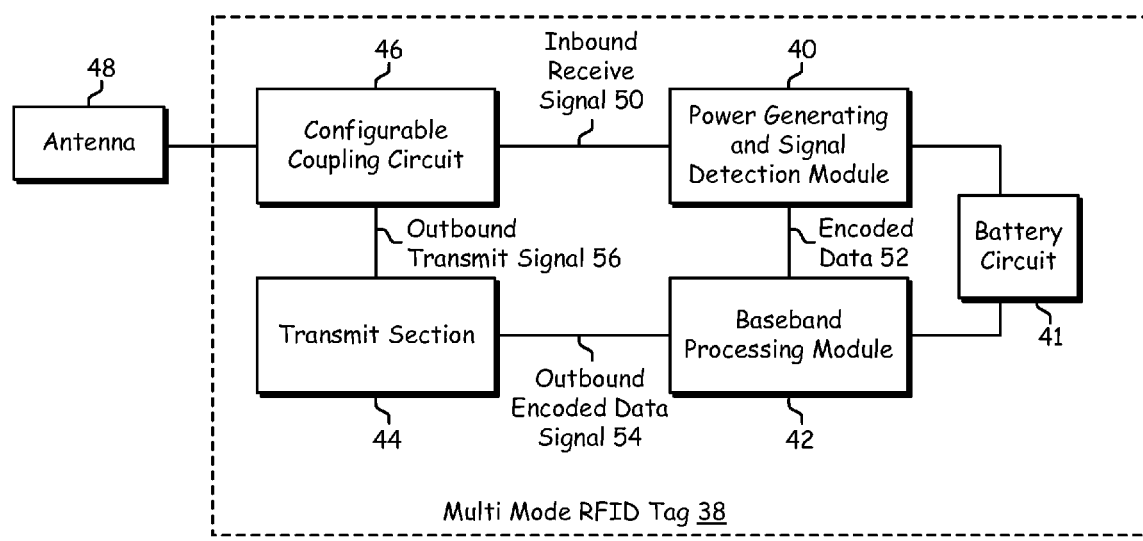
FIG. 2 is a schematic block diagram of an embodiment of a multi-mode RFID tag in accordance with the present invention.

FIG. 2 is a schematic block diagram of an embodiment of a multi-mode RFID tag 38 which can be used as one of the RFID tags 20-30 in FIG. 1. The multi-mode RFID tag 38 is operable to communicate in a far field mode to an RFID reader 14-18 and in a near field mode to an RFID reader 14-18. The multi-mode RFID tag 38 includes a power generating and signal detection module 40, a baseband processing module 42, a transmit section 44, a configurable coupling circuit 46, and an antenna section 48. The multi-mode RFID tag 38 may be an active tag and include a battery 41. If an active tag, the battery 41 may replace or assist the power generating function of the power generating and signal detection module 40 to power the baseband processing module 42, transmit section 44 and configurable coupling circuit 46. If the multi-mode RFID tag 38 is a passive tag, no battery 41 is present.

The power generating and signal detection module 40, baseband processing module 42 and transmit section 44 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. One or more of the modules may have an associated memory element, which may be a single memory device, a plurality of memory devices, and/or embedded circuitry of the module. Such a memory device may be a read-only memory, random access memory, volatile memory, non-volatile memory, static memory, dynamic memory, flash memory, cache memory, and/or any device that stores digital information. Note that when the module implements one or more of its functions via a state machine, analog circuitry, digital circuitry, and/or logic circuitry, the memory element storing the corresponding operational instructions may be embedded within, or external to, the circuitry comprising the state machine, analog circuitry, digital circuitry, and/or logic circuitry. Further note that, the memory element stores, and the module executes, hard coded and/or operational instructions corresponding to at least some of the steps and/or functions illustrated in FIGS. 1-7.

In an embodiment, the antenna section 48 is a dipole type antenna operable at microwave or UHF ranges. Folded dipoles or half-wave dipoles can be used or other dipole type antennas that can be bent or meandered with capacitive tip-loading or bowtie-like broadband structures are also used for compact applications. In general, the antenna section 48 can be one of several types of antennas optimized for the desired frequency of operation and application.

In operation, the configurable coupling circuit 46 is operable to couple the power generating and signal detection module 40 to the antenna section 48 in a far field mode or to couple the power generating and signal detection module 40 to an inductor or coil antenna in the configurable coupling circuit 46 in a near field mode, as explained in more detail below. In either mode, the configurable coupling circuit 46 is operable to transmit an inbound receive signal 50 to the power generating and signal detection module 40. In a passive embodiment of multimode RFID tag 38, the RFID reader 14-18 first generates an unmodulated, continuous wave (CW) signal to activate and power the tag. The power generating and signal detection module 40 converts this type of CW unmodulated inbound receive signal 50 into a supply voltage. The power generating circuit signal detection module 40 stores the supply voltage and provides it to the other modules for operation.

The RFID reader 14-18 then transmits a modulated, encoded interrogation inbound receive signal 50. The power generating and signal detection module 40 receives the inbound receive signal 50 from the configurable coupling circuit 46. The power generating and signal detection module 40 demodulates the inbound receive signal 50 to recover the encoded data 52. Depending on the RFID reader 14-18 and mode of operation, the inbound receive signal 50 may be modulated using Amplitude Shift Keying (ASK) or Phase Shift Keying (PSK) or other type of modulation. In an embodiment, the power generating and signal detection module 40 is operable to demodulate the inbound receive signal 50 using one or more types of demodulation techniques to recover the encoded data 52 from the inbound receive signal 50. The power generating and signal detection module 40 transmits the recovered encoded data 52 to the baseband processing module 42.

The baseband processing module 42 receives the encoded data 52 and decodes the encoded data 52 using one or more protocols. Different data encoding protocols may be defined for signals in near field mode and signals in far field mode. For example, in near field mode, a first data encoding protocol may be used by the baseband processing module 42 for decoding data while a second data encoding protocol may be used by the baseband processing module 42 for decoding data in far field mode. For instance, Manchester encoding may be used when in near field mode and Miller-modulated subcarrier coding and/or biphase-space encoding may be used when in the far field mode. Alternatively, the baseband processing module 42 may use the same data encoding protocol for near field mode and far field mode.

In an embodiment, the baseband processing module 42 is programmed with multiple encoding protocols to be operable to decode the encoded data 52 in accordance with different protocols. Thus, the baseband processing module 42 is operable to decode the encoded data 52 using different encoding protocols when necessary in either near field or far field mode. For example, when operating in near field mode, the baseband processing module 42 may attempt to decode the encoded data 52 using a first protocol typical in near field operations, such as Manchester coding. If such decoding is unsuccessful, the baseband processing module is operable to attempt decoding the encoded data 52 with a next protocol until the encoded data 52 is decoded. Similarly, when operating in far field mode, the baseband processing module 42 may attempt to decode the encoded data 52 using a second protocol typical in far field operations, such as Miller-modulated subcarrier coding and biphase-space encoding. If such decoding is unsuccessful, the baseband processing module is operable to attempt decoding the encoded data 52 with a next protocol until the encoded data is decoded.

Once decoded, the baseband processing module 42 processes the decoded data to determine a command or commands contained therein. The command may be to store data, update data, reply with stored data, verify command compliance, acknowledgement, change mode of operation, etc. If the command(s) requires a response, the baseband processing module 42 determines the response data and encodes the response data into outbound encoded data 54. Preferably, the baseband processing module 42 encodes the data for the response using the same encoding protocol used to decode the inbound encoded data 52. Once encoded, the baseband processing module 42 provides the outbound encoded data 54 to the transmit section 44. The transmit section 44 receives the outbound encoded data 54 and converts the outbound encoded data 54 into an outbound transmit signal 56.

The outbound transmit signal 56 is a carrier signal with amplitude modulation, such as ASK, or phase modulation, such as PSK, or load modulation of the carrier signal can be used. The frequency of the carrier signal in near field mode in one embodiment is a low frequency (LF) or a high frequency (HF) range. In accordance with ISO series standards, such near field ranges are a low frequency at approximately 135 KHz or less and a high frequency at approximately at 13.56 MHz. In far field mode, in an embodiment, the frequency of the carrier signal is in the ultra high frequency range or microwave range. In accordance with ISO series standards, such far field ranges are at approximately 2.45 GHz frequency, approximately 860 MHZ to 930 MHz ultra high frequency (UHF) range or approximately 433.92 MHz UHF.

In near field mode, the configurable coupling circuit 46 is operable to couple the transmit section 44 to an inductor in the configurable coupling circuit 46 to transmit the outbound transmit signal 56 using electromagnetic or inductive coupling to an RFID reader 16-18. In far field mode, the configurable coupling circuit 46 is operable to couple the transmit section 44 to the antenna section 48, and the multi-mode RFID tag 38 then utilizes a back-scattering RF technology to transmit the outbound transmit signal 56 to RFID readers 16-18.

Figure 3:
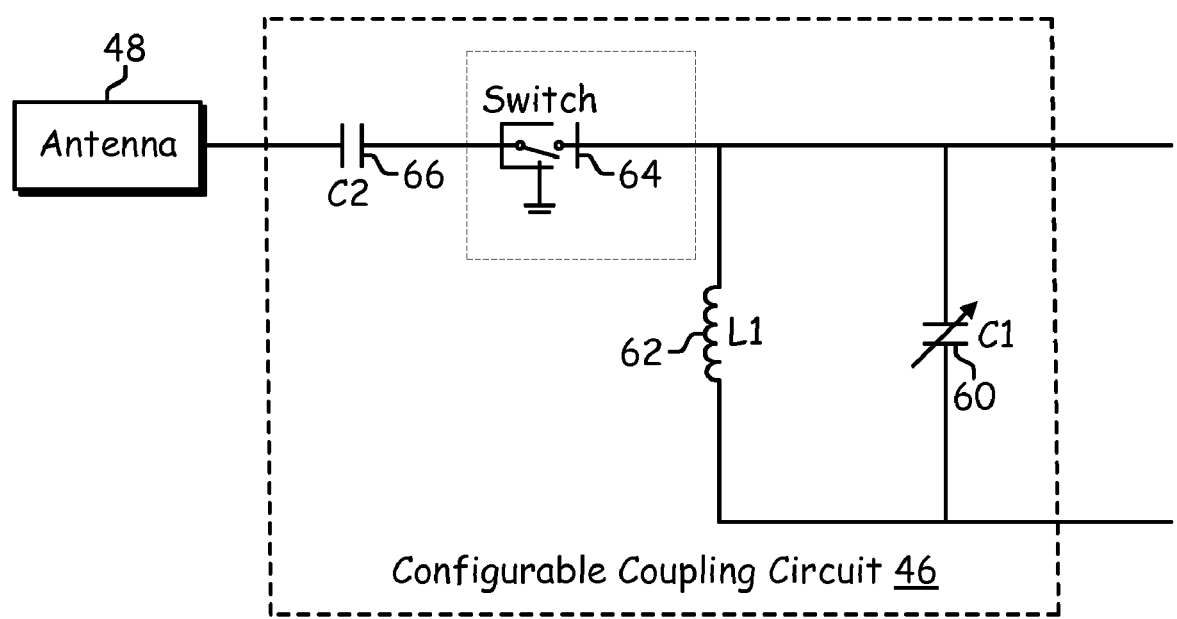
FIG. 3 is a schematic block diagram of a configurable coupling circuit in one embodiment of a multimode RFID tag in accordance with the present invention.

FIG. 3 is a block diagram of one embodiment of the configurable coupling circuit 46. The configurable coupling circuit 46 includes a capacitor C1 60, an inductor L1 62, and a second capacitor C2 66. In one embodiment, the configurable coupling circuit includes a switch 64. The switch 64 in this embodiment connects the antenna section 48 and capacitor 66 to the inductor L1 and capacitor C1 in a first position. In a second position, the switch 64 connects the antenna section 48 and capacitor 66 to ground or otherwise isolates the antenna from the inductor L1 and capacitor C1. The switch 64 may be an actuator, a transistor circuit, or other equivalent device. For an active tag, a battery 41 may power the switch 64. For passive tags, an RFID reader 16-18 transmits a continuous wave, unmodulated signal to power the multi-mode RFID tag 38. The multi-mode RFID tag 38 may then use voltage generated from the power generating and signal detection module 40 to power the switch 64 to change positions. In an alternate embodiment, the multi-mode RFID tag 38 may be configured prior to provisioning to operate in only near field mode or far field mode. For example, the multi-mode RFID tag 38 may be hardwired at manufacturing to only couple to the antenna section 48 for operation in far field mode or to only couple to the coil antenna 62 to operate in near field mode. In another example, the RFID tag 38 may be pre-programmed to operate only in near field mode or far field mode prior to provisioning.

In far field mode, the antenna 48 and capacitor C2 are coupled to inductor L1 and capacitor C1. Inductor L1 and capacitor C1 are operable as an impedance matching circuit for the antenna 48. The inductor L1 provides an inductance value for impedance matching for the antenna 48 and the capacitor C1 provides a capacitance value to the impedance matching for the antenna 48. In an embodiment, the capacitor C1 is adjustable or variable, such as a digital switched capacitor, and is operable to be tuned to provide a desired capacitance value for the impedance matching in far field mode. Thus, in far field mode, the antenna 48 and the configurable coupling circuit 46 receive the inbound receive signal 50 and are operable to provide the inbound receive signal 50 to the power generating and signal detection module 40.

In near field mode, the switch 64 is open such that the capacitor C2 is floating or connected to ground. In another embodiment, the multi-mode RFID tag 38 does not include a switch 64 but is hardwired at manufacturing to isolate the antenna 48 and/or capacitor C2 from the inductor L1. In an alternate embodiment, other devices other than a switch 64 may be used to isolate the antenna 48 and/or capacitor C2 and the inductor L1 while the multi-mode RFID tag 38 is in near field mode.

The inductor L1 acts as a coil antenna to provide electromagnetic or inductive coupling with the coil or coils of RFID reader 14-18. The inductor L1 and the capacitor C1 form a resonant circuit tuned to the transmission frequency of the RFID reader 14-18. In response to the magnetic field generated by the RFID reader 14-18 coil antenna, the voltage at the inductor L1 reaches a maximum due to resonance step-up in the parallel resonant circuit. In an embodiment, the capacitor C1 is adjustable or variable and is operable to be tuned to provide optimization of the parallel resonant circuit. For example, the capacitor C1 may be adjusted to provide optimization of at least one of bandwidth, quality factor, gain and roll-off of the configurable coupling circuit 46 in the near field mode. Generally, to operate in the near field mode, the distance between the inductor L1 of the RFID tag 38 and the coil antenna of the RFID reader 14-18 must not exceed approximately $\lambda/2\pi$, so that the inductor L1 is located within the magnetic field created by the coil antenna of the RFID reader 14-18. In near field mode, the configurable coupling circuit 46 is operable to provide the inbound receive signal 50 to the power generating and signal detection module 40.

During transmission, the inductor L1 acts as a coiled antenna that creates the magnetic field from current flowing through the inductor L1 using the energy provided to the transmit section 44 by the power generating and signal detection module 40. Again, in order to receive the outbound transmit signal 56 in the near field mode, the distance between the inductor L1 of the RFID tag 38 and the coil antenna of the RFID reader 14-18 should be equal to or less than approximately $\lambda/2\pi$, so that the coil antenna of the RFID reader 14-18 is located within the magnetic field created by the inductor L1.

In one embodiment, as explained above with respect to FIG. 2, the baseband processing module 42 is operable to process commands from an RFID reader 14-18. For example, one command from the RFID reader 14-18 may be a mode command to operate the multi-mode RFID tag 38 in near field mode or in far field mode. Upon processing such mode command, the baseband processing module 42 is operable to configure the multi-mode RFID tag 38 to operate in near field more or far field mode. In another embodiment, the multi-mode RFID tag may have a preset input that may be set by a user to determine the mode of operation. Thus, upon installation of the multi-mode RFID tag in a particular application, the RFID tag may be preset to the mode best suited for such application.

Figure 4:
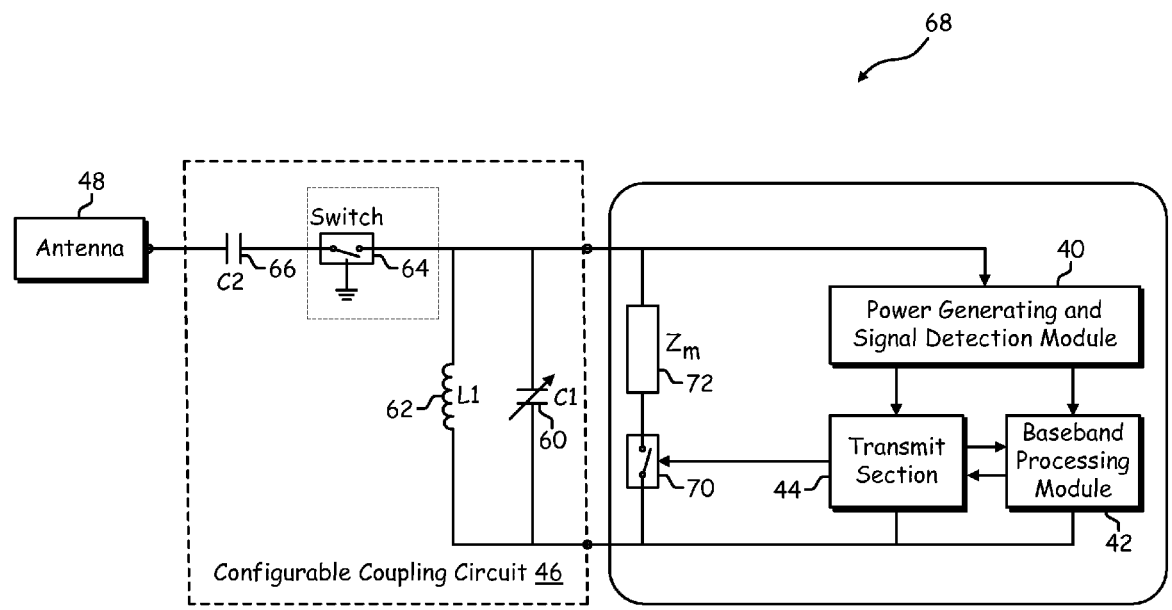
FIG. 4 is a schematic block diagram of another embodiment of a multimode RFID tag in accordance with the present invention.

FIG. 4 illustrates another embodiment of a multi-mode RFID tag 68 in accordance with the present invention. Similarly, to FIGS. 2 and 3, the multi-mode RFID tag 68 in this embodiment includes a power generating and signal detection module 40, a baseband processing module 42, a transmit section 44, a configurable coupling circuit 46, and an antenna section 48. In addition, a switch 70 and load resistance Zm are connected between the transmit section and configurable coupling circuit. In operation, the switching on and off of the load resistance Zm at the inductor L1, e.g. the coil antenna in the near field mode, effects voltage changes at the RFID reader's coil antenna and thus has the effect of an amplitude modulation of the RFID reader's antenna voltage by the multi-mode RFID tag 38. By switching on and off of the load resistance Zm in response to the outbound encoded data 54, the transmit section 44 is operable to transfer the data from the RFID tag to the RFID reader with load modulation. Similarly, the switch 70 and load resistance Zm can modulate the RF backscatter signal from the transmit section 44 to modulate the reflected RF outbound transmit signal 56 in far field mode. Thus, the switch 70 and load resistance Zm provide an efficient modulation of the outbound transmit signal 56 for the multi-mode RFID tag 38.

The embodiment 4 illustrates a passive RFID multi-mode tag 38. In another embodiment shown in FIG. 2, the multi-mode tag 38 may also be designed as an active tag by including a battery 41 to provide the power to operate the RFID tag 38. With active tag design, the power generating circuit may not be necessary and an RFID reader 14-18 does not need to transmit a CW, unmodulated signal to power the RFID tag 38 before communicating with the RFID tag 38. In addition, the battery 41 would allow the RFID tag 38 to switch between near field mode and far field mode in order to detect signals from an RFID reader 14-18 without waiting for a power signal and command from an RFID reader 14-18. The disadvantage of active tags with a battery is the shorter duration of life of the tag. The tag would become inoperable when the battery loses its charge. However, an active multi-mode RFID tag 38 may be optimal for higher processing applications or applications that only need certain duration, e.g. tags for perishable items.

Figure 5:
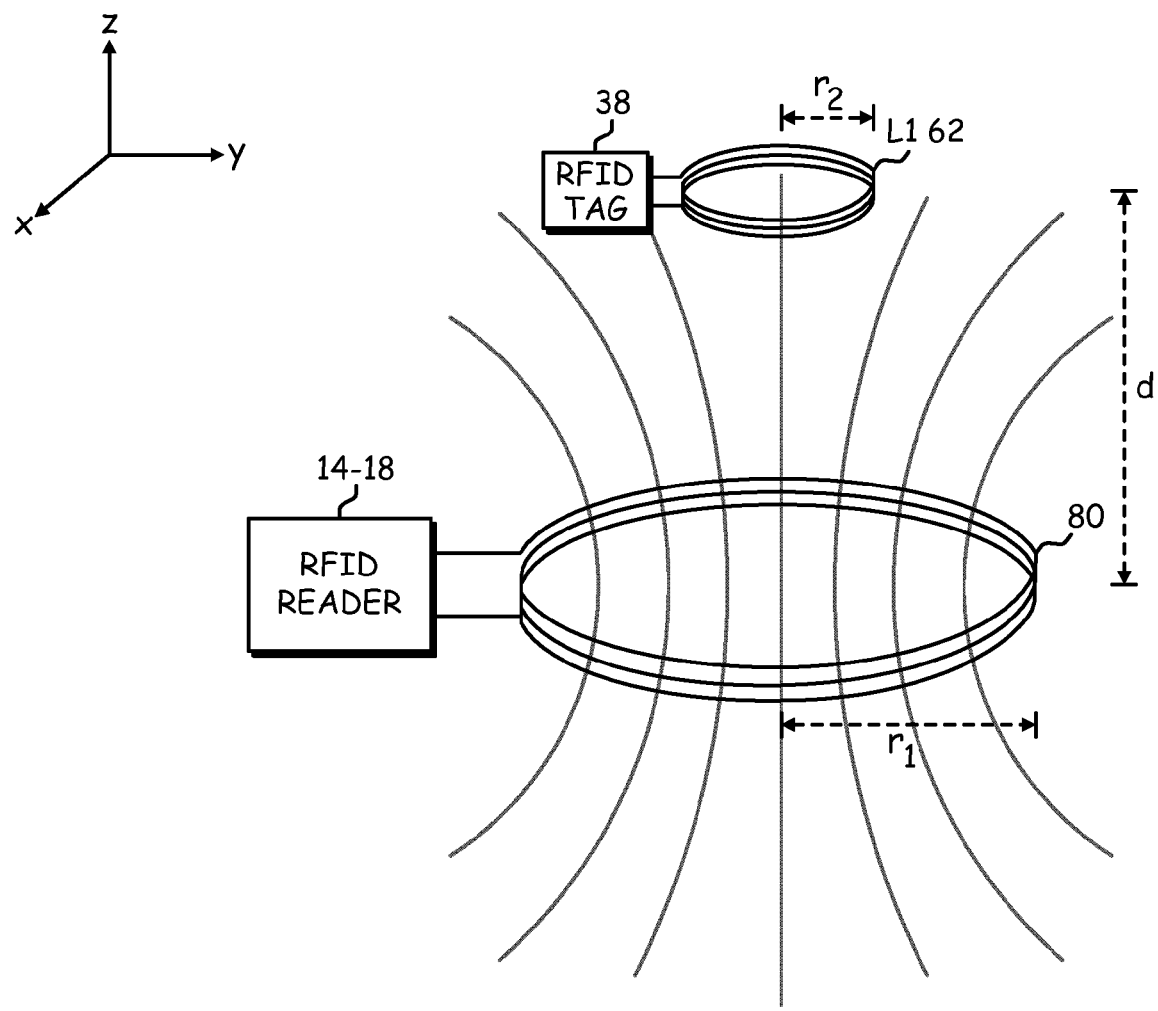
FIG. 5 is a schematic block diagram of coil antennas in one embodiment of a multimode RFID tag and RFID reader in accordance with the present invention.

FIG. 5 illustrates a schematic block diagram of the inductor L1 62 in one embodiment of the multimode RFID tag 38 in accordance with the present invention. In this embodiment, the inductor L1 in the configurable coupling circuit 46 operates in the ultra high frequency (e.g., UHF) range in near field mode. Due to higher frequencies, the coils of the inductor L1 can be much smaller sized coils and can be integrated on chip with other modules of the multi-mode RFID tag 38. As shown in FIG. 5, the inductor L1 62 has a radius $r_2$; the coil antenna 80 of the RFID reader 14-18 has a radius $r_1$; and the distance between the inductor L1 and the coil antenna 80 equals distance d. In this embodiment, with reference to FIG. 5, the magnetic field $M_{12}$ between the coil antenna 80 of the RFID reader 14-18 and the inductor L1 of the RFID tag 38 is:

$$M_{12} = \frac{\mu_0 \cdot \pi \cdot N_1 \cdot N_2 \cdot r_1^2 \cdot r_2^2}{2\sqrt{(d^2 + r_1^2)^3}}$$

wherein $\mu_0$ is the permeability of space. The inductance $L_{tag}$ and Q factor of the tag $Q_{tag}$ can be determined from:

$$L_{TAG} \cong \mu_0 \cdot N^2 \cdot r_{av} \cdot \ln(2r_{av}/a)$$

$$Q_{TAG} = \frac{\omega_0 \cdot L}{r_{series}} \propto \omega_0$$

For example, for one embodiment of a multi-mode RFID tag 38 operating in near field mode in UHF range at approximately 900 MHz, the $L_{tag}$ equals approximately 56.6 nH and $Q_{tag}$ equals approximately 4.9.

Figure 6:
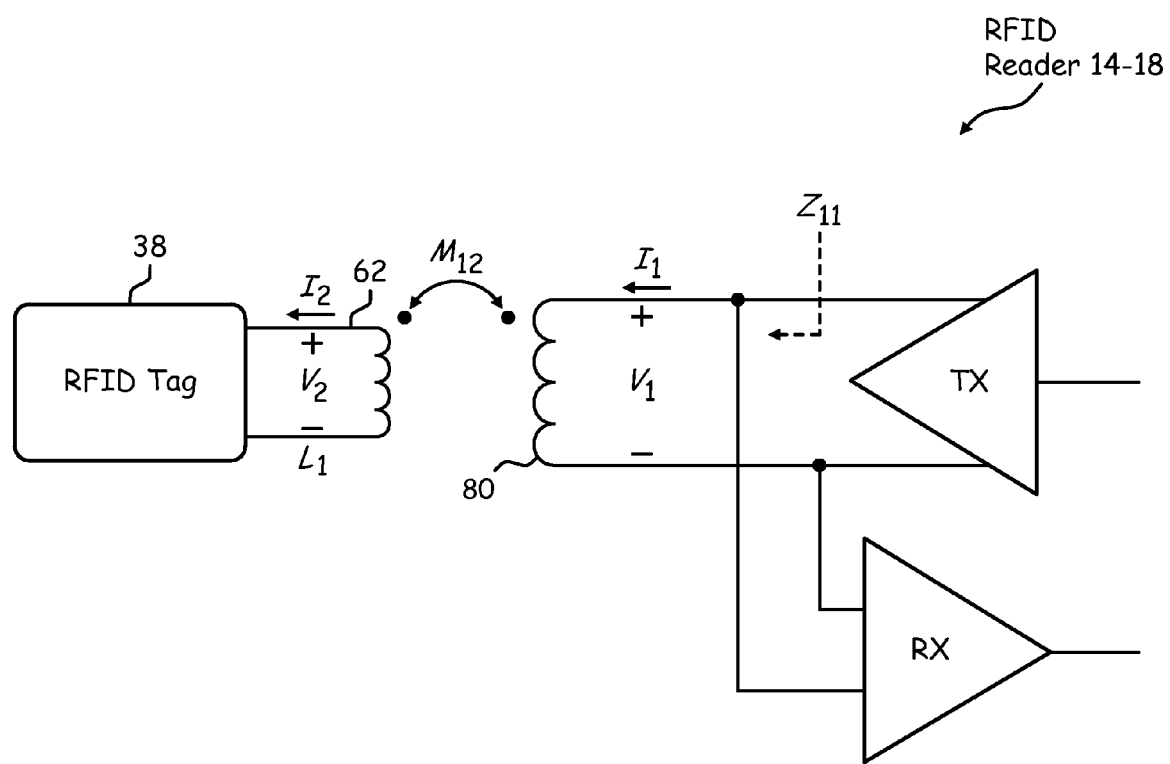
FIG. 6 is a schematic block diagram of magnetic coupling between a multi-mode RFID tag and RFID reader in one embodiment in accordance with the present invention.

FIG. 6 illustrates the range between the RFID tag 38 and the RFID reader 14-18 in the UHF near field mode assuming the embodiment of FIG. 5. As seen in FIG. 6, the range is limited by the transmit power of the tag. For example:

$$Z_{12}(\omega_0) = \frac{V_2}{I_1} = \omega_0 M_{12} Q_2$$

$$\Delta Z_{11}(\omega_0) \propto \omega_0^2 \cdot M_{12}^2 \cdot Q_2$$

and assuming the maximum transmit current of the tag is 500 mA, then the range is approximately 5 mm with a −55 dBV minimum receive signal, the tag's minimum voltage is 0.25 volts, and a 60 dB blocker to signal ratio. Note that the tag's input voltage=$I_1 * Z_{12}$; the reader's minimum RX signal=0.5* $(I_1 * \Delta Z_{11})$2; and the blocker to signal ratio=$Z_{11}/\Delta Z_{11}$. A Manchester coding with data rate of 50 kbps is utilized in this embodiment.

Though the range of communication is smaller (e.g., <5 mm) in UHF near field mode than at lower frequencies (such as HF and LF), such short range, UHF near field RFID communications are well suited for near read applications, such as inventory items, monitory paper authentication, passports, credit cards, etc. The near field UHF operation of the RFID tag 38 also has more efficient operation near fluids, such as fluid medication bottles. In addition, the inductor L1 or coil antenna 62 may be designed sufficiently small to be integrated on chip. By integrating the RFID tag 38 onto a single integrated circuit, the cost of the RFID tag 38 can be significantly reduced.

The multi-mode RFID tag 38 thus provides near field and far field mode operation. In one embodiment the multi-mode RFID tag operates in UHF range in the near field mode with an integrated on chip inductor or coil antenna. By operating in both near field and far field mode, the RFID tag provides multi-standard, multi-technology option for use in multiple applications. As such, the RFID tags are not limited to only near read or far read applications but can be used in both type applications and are operable to be switched from near field mode to far field mode or from far field mode to near field mode to accommodate different types of RFID readers and differing distances between the multi-mode RFID tag and an RFID reader.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The invention claimed is:

1. A multi-mode radio frequency identification (RFID) tag comprises:
    a configurable coupling circuit that, when the multi-mode RFID tag is in a near field mode, provides electromagnetic coupling to an RFID reader and, when the multi-mode RFID tag is in a far field mode, provides radio frequency (RF) coupling to the RFID reader;
    a power generating and signal detection module coupled to the configurable coupling circuit, wherein the power generating and signal detection module converts an inbound receive signal into a supply voltage and recovers encoded data from the inbound receive signal;
    a baseband processing module coupled to:
        decode the encoded data to produce a decoded signal;
        process the decoded signal;
        when the processing of the decoded signal indicates generating a response signal, generate the response signal; and
        encode the response signal to produce outbound encoded data;
    a transmit section coupled to the configurable coupling circuit, wherein the transmit section converts the outbound encoded data into an outbound transmit signal.

2. The multi-mode RFID tag of claim 1, wherein the configurable coupling circuit comprises:
    a first capacitor coupled to an antenna in the far field mode and open or coupled to ground in the near field mode;
    an inductor to provide the electromagnetic coupling in the near field mode and to provide an inductance value for impedance matching in the far field mode; and
    a second capacitor coupled to the inductor to provide a capacitance value to tune the impedance matching for the far field mode or to tune at least one of: bandwidth, quality factor, gain and roll-off of the configurable coupling circuit in the near field mode.

3. The multi-mode RFID tag of claim 2, wherein the second capacitor is adjustable.

4. The multi-mode RFID tag of claim 3, wherein the antenna in the far field mode is operable to transmit and receive RF signals in an ultra high frequency (UHF) range.

5. The multi-mode RFID tag of claim 4, wherein the inductor to provide the electromagnetic coupling in the near field mode comprises a coil inductor operable to provide the electromagnetic coupling in ultra high frequency (UHF) range in the near field mode.

6. The multi-mode RFID tag of claim 4, wherein the coil inductor is integrated on-chip.

7. The multi-mode RFID tag of claim 6, wherein the coil inductor is integrated on a CMOS chip.

8. The multi-mode RFID tag of claim 1, wherein the baseband processing module that is coupled to decode the encoded data to produce a decoded signal, further functions to:
    utilize a first encoding/decoding protocol when in the near field mode; and
    utilize a second encoding/decoding protocol when in the far field mode.

9. The multimode RFID tag of claim 8, wherein the baseband processing module coupled to encode the response signal to produce encoded data, comprises:
    at least a first encoding processing module for encoding the response signal in near field mode in the first encoding protocol and for encoding the response signal in far field mode in the second encoding protocol.

10. The multi-mode RFID tag of claim 4, wherein the inductor to provide the electromagnetic coupling in the near field mode comprises a coil inductor operable to provide the electromagnetic coupling in low frequency (LF) range in the near field mode.

11. The multi-mode RFID tag of claim 1, wherein the configurable coupling circuit is operable to switch to near field mode and provide electromagnetic coupling to an RFID reader in response to a command from the RFID reader.

12. The multi-mode RFID tag of claim 1, wherein the configurable coupling circuit is operable to switch to far field mode and provide RF coupling to an RFID reader in response to a command from the RFID reader.

13. The multi-mode RFID tag of claim 1, wherein the configurable coupling circuit is configured to operate in far field mode and provide RF coupling to the RFID reader until it receives a command from the RFID reader to switch to near field mode and provide electromagnetic coupling to the RFID reader.

14. A method for operating a multi-mode RFID tag, comprising:
    configuring a coupling circuit of the multi-mode RFID tag to provide RF coupling to an RFID reader in far field mode and inductive coupling to an RFID reader in a near field mode; communicating with the RFID reader in one of the far field mode and the near field mode; when a command is received from the RFID reader, configuring the coupling circuit to provide the other one of the far field mode and the near field mode; communicating with the RFID in the other one of the far field mode and the near field mode; and
    wherein communicating with the RFID reader comprises: receiving an inbound signal from the RFID reader, recovering an encoded data signal from the inbound signal; decoding the recovered encoded data signal, wherein the encoded data signal is encoded with a first encoding protocol; processing the decoded data signal; generating a response signal to the decoded data signal in response to a command in the decoded data signal that requires a response to the RFID reader; encoding the response signal with the first encoding protocol.

15. The method of claim 14, further comprising:
    modulating the response signal encoded with the first encoding protocol onto a carrier signal, wherein the carrier signal is in the ultra-high frequency (UHF) range; and
    transmitting the modulated carrier signal to the RFID reader using RF coupling.

16. The method of claim 14, further comprising:
modulating the response signal encoded with the second encoding protocol onto a carrier signal, wherein the carrier signal is in the ultra-high frequency (UHF) range; and
transmitting the modulated carrier signal to the RFID reader using inductive coupling.

17. The method of claim 16, further comprising:
generating power to operate the multi-mode RFID tag from an inbound signal from the RFID reader in both near field mode and far field mode.

18. A radio frequency identification (RFID) tag comprises:
a configurable coupling circuit operable to provide electromagnetic coupling to a RFID reader in a near field mode and to provide RF coupling to a RFID reader in a far field mode;
a power generating and signal detection module coupled to the configurable coupling circuit, wherein the power generating and signal detection module converts an inbound receive signal from the RFID reader into a supply voltage and recovers encoded data from the inbound receive signal in the near field mode and in the far field mode to produce a recovered encoded data signal;
a baseband processing module operable to:
    decode the recovered encoded data signal using a first protocol in when in the far field mode and using a second protocol when in the near field mode to produce a decoded data signal;
    processing the decoded data signal;
    generating a response signal to the decoded data signal in accordance with a command in the decoded data signal; and
    encoding the response signal using the first protocol when in the far field mode and using the second protocol when in the near field mode to produce outbound encoded data; and
a transmit section coupled to the configurable coupling circuit, wherein the transmit section converts the outbound encoded data into an outbound transmit signal.

19. The RFID tag of claim 18, wherein the outbound transmit signal is in an ultra high frequency (UHF) range in both far field mode and near field mode.

20. The RFID tag of claim 18, wherein the configurable coupling circuit comprises:
a first capacitor coupled to an antenna in the far field mode and open or coupled to ground in the near field mode;
an inductor to provide the electromagnetic coupling in the near field mode and to provide an inductance value for impedance matching in the far field mode; and
a second capacitor coupled to the inductor to provide a capacitance value to tune the impedance matching for the far field mode or to tune bandwidth, quality factor, gain, or roll-off of configurable coupling circuit in the near field mode.

21. The RFID tag of claim 20, wherein the outbound transmit signal is in an ultra high frequency (UHF) range in both far field mode and near field mode.

22. A radio frequency identification (RFID) tag comprises:
a radio frequency (RF) antenna operable to provide RF coupling in a far field mode;
a coil antenna operable to provide electromagnetic coupling in the near field mode;
a signal detection module coupled to the RF antenna or to the coil antenna, wherein the signal detection module recovers encoded data from the inbound receive signal to produce a recovered encoded data signal;
a baseband processing module operable to:
    decode the recovered encoded data signal using a first protocol when operating in the far field mode and using a second protocol when operating in the near field mode to produce a decoded data signal;
    processing the decoded data signal;
    generating a response signal to the decoded data signal in accordance with a command in the decoded data signal; and
    encoding the response signal using the first protocol when operating in the far field mode and using the second protocol when operating in the near field mode to produce outbound encoded data; and
a transmit section coupled to the RF antenna or to the coil antenna, wherein the transmit section converts the outbound encoded data into an outbound transmit signal.

23. The RFID tag of claim 22, further comprising a configurable coupling circuit operable to:
couple the RF antenna to the signal detection module and the transmit section when operating in far field mode; and
couple the coil antenna to the signal detection module and the transmit section when operating in near field mode.

24. The RFID tag of claim 22, wherein the RFID tag is configured before provisioning to couple the RF antenna to the signal detection module and the transmit section for operation in far field mode or couple the coil antenna to the signal detection module and the transmit section for operation in near field mode.

* * * * *